United States Patent
Lin

(10) Patent No.: US 10,572,009 B2
(45) Date of Patent: *Feb. 25, 2020

(54) EYE TRACKING METHOD, ELECTRONIC DEVICE, AND NON-TRANSITORY COMPUTER READABLE STORAGE MEDIUM

(71) Applicant: HTC Corporation, Taoyuan (TW)

(72) Inventor: Yung-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,726

(22) Filed: May 22, 2018

(65) Prior Publication Data
US 2018/0335840 A1    Nov. 22, 2018

Related U.S. Application Data

(60) Provisional application No. 62/509,196, filed on May 22, 2017.

(51) Int. Cl.
*G06F 3/01* (2006.01)
*G06K 9/32* (2006.01)
(Continued)

(52) U.S. Cl.
CPC ......... *G06F 3/013* (2013.01); *G06K 9/00604* (2013.01); *G06K 9/036* (2013.01); *G06K 9/3233* (2013.01); *G02B 27/017* (2013.01)

(58) Field of Classification Search
CPC .... G06F 3/013; G06K 9/00604; G06K 9/036; G06K 9/3233; G02B 27/017
See application file for complete search history.

(56) References Cited

U.S. PATENT DOCUMENTS

| 5,912,721 A | 6/1999 | Yamaguchi et al. |
| 2004/0196433 A1* | 10/2004 | Durnell .............. G06K 9/00604 |
| | | 351/209 |

(Continued)

FOREIGN PATENT DOCUMENTS

| CN | 102125422 A | 7/2011 |
| CN | 105373766 A | 3/2016 |

(Continued)

OTHER PUBLICATIONS

Dongheng Li et al., "Starburst: A robust algorithm for video-based eye tracking", Jan. 1, 2005, retrieved from the Internet: http://thirtysixthspan.com/openEyes/starburst.pdf.

(Continued)

*Primary Examiner* — Stephen G Sherman
(74) *Attorney, Agent, or Firm* — CKC & Partners Co., LLC

(57) ABSTRACT

An eye tracking method includes: capturing, by a camera, an image of an eye; detecting, by a processing circuit, a pupil region of interest in the image of the eye; analyzing, by the processing circuit, the pupil region of interest to obtain a gaze vector of the pupil region of interest; calculating, by the processing circuit, a viewpoint of the eye according to the gaze vector based on an eye model, in which the eye model includes a matrix indicating relationship between the viewpoint of the eye and the gaze vector of the pupil region of interest; and tracking, by the processing circuit, a motion of the eye based on the viewpoint calculated using the eye model.

14 Claims, 10 Drawing Sheets

(51) Int. Cl.
*G06K 9/00* (2006.01)
*G06K 9/03* (2006.01)
*G02B 27/01* (2006.01)

(56) References Cited

U.S. PATENT DOCUMENTS

| | | | |
|---|---|---|---|
| 2005/0175218 A1* | 8/2005 | Vertegaal | A61B 3/113 382/103 |
| 2007/0014552 A1* | 1/2007 | Ebisawa | A61B 3/113 396/51 |
| 2014/0282196 A1* | 9/2014 | Zhao | G06F 3/013 715/771 |
| 2016/0045109 A1 | 2/2016 | Tsou et al. | |

FOREIGN PATENT DOCUMENTS

| | | |
|---|---|---|
| CN | 106339087 A | 1/2017 |
| TW | 201035813 A | 10/2010 |
| TW | 201704934 A | 2/2017 |

OTHER PUBLICATIONS

Jian-nan Chi et al., "Hybrid Particle and Kalman Filtering for Pupil Tracking in Active IR Illumination Gaze Tracking System", Mathematical Problems in Engineering, vol. 2014, Jan. 1, 2014, pp. 1-17.
Takeshi Takegami et al., "An Algorithm for Model-Based Stable Pupil Detection for Eye Tracking System", Systems & Computers in Japan, vol. 35, No. 13, Jan. 1, 2004, pp. 21-31.
Arantxa Villanueva et al., "Models for Gaze Tracking Systems", EURASIP Journal on Image and Video Processing, vol. 2007, Jan. 1, 2007, pp. 1-16.
Jia-Hao Wu et al., "Fast iris ellipse fitting based gaze tracking with visible light for real-time wearable eye trackers", 2016 IEEE 5th Global Conference on Consumer Electronics, IEEE, Oct. 11, 2016, pp. 1-2.
The extended search report of the corresponding European application dated Oct. 15, 2018.
Lech Swirski et al., "A fully-automatic, temporal approach to single camera, glint-free 3D eye model fitting", http://2013.petmei.org/wp-content/uploads/2013/09/petmei2013_session2_3.pdf, 2013, pp. 1-5.
David Perra et al., "Adaptive eye-camera calibration for head-worn devices", https://www.cv-foundation.org/openaccess/content_cvpr_2015/papers/Perra_Adaptive_Eye-Camera_Calibration_2015_CVPR_paper.pdf, Jun. 7, 2015, pp. 4146-4155.
Corresponding Taiwan office actions dated Apr. 15, 2019 and Apr. 18, 2019.
Corresponding Chinese office action dated Sep. 27, 2019.
Corresponding Taiwan office action dated Nov. 29, 2019.

* cited by examiner

EYE TRACKING METHOD, ELECTRONIC DEVICE, AND NON-TRANSITORY COMPUTER READABLE STORAGE MEDIUM

RELATED APPLICATIONS

This application claims priority to U.S. Provisional Application Ser. No. 62/509,196, filed May 22, 2017, which is herein incorporated by reference.

BACKGROUND

Technical Field

The present disclosure relates to an electronic device and an eye tracking method. More particularly, the present disclosure relates to the electronic device and the eye tracking method in a head mount display (HMD).

Description of Related Art

Nowadays, eye tracking methods are used in various applications. For example, in virtual reality (VR) or augmented reality (AR) application, eye tracking methods are used in the VR/AR system to trace a user's gazing direction in order to provide corresponding reaction and/or control in the VR/AR environment.

SUMMARY

One aspect of the present disclosure is related to an eye tracking method. The eye tracking method includes capturing, by a camera, an image of an eye; detecting, by a processing circuit, a pupil region of interest in the image of the eye; analyzing, by the processing circuit, the pupil region of interest to obtain a gaze vector of the pupil region of interest; calculating, by the processing circuit, a viewpoint of the eye according to the gaze vector based on an eye model, in which the eye model includes a matrix indicating relationship between the viewpoint of the eye and the gaze vector of the pupil region of interest; and tracking, by the processing circuit, a motion of the eye based on the viewpoint calculated using the eye model.

Another aspect of the present disclosure is related to an electronic device. In accordance with some embodiments of the present disclosure, the electronic device includes a camera, a processing circuit electrically connected to the camera, a memory electrically connected to the processing circuit, and one or more programs. The one or more programs are stored in the memory and configured to be executed by the processing circuit. The one or more programs including instructions for: controlling the camera to capture an image of an eye; detecting a pupil region of interest in the image of the eye; analyzing the pupil region of interest to obtain a gaze vector of the pupil region of interest; calculating a viewpoint of the eye according to the gaze vector based on an eye model, in which the eye model includes a matrix indicating relationship between the viewpoint of the eye and the gaze vector of the pupil region of interest; and tracking a motion of the eye based on the viewpoint calculated using the eye model.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: controlling a camera to capture an image of an eye; detecting a pupil region of interest in the image of the eye; analyzing the pupil region of interest to obtain a gaze vector of the pupil region of interest; calculating a viewpoint of the eye according to the gaze vector based on an eye model, in which the eye model includes a matrix indicating relationship between the viewpoint of the eye and the gaze vector of the pupil region of interest; and tracking a motion of the eye based on the viewpoint calculated using the eye model.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
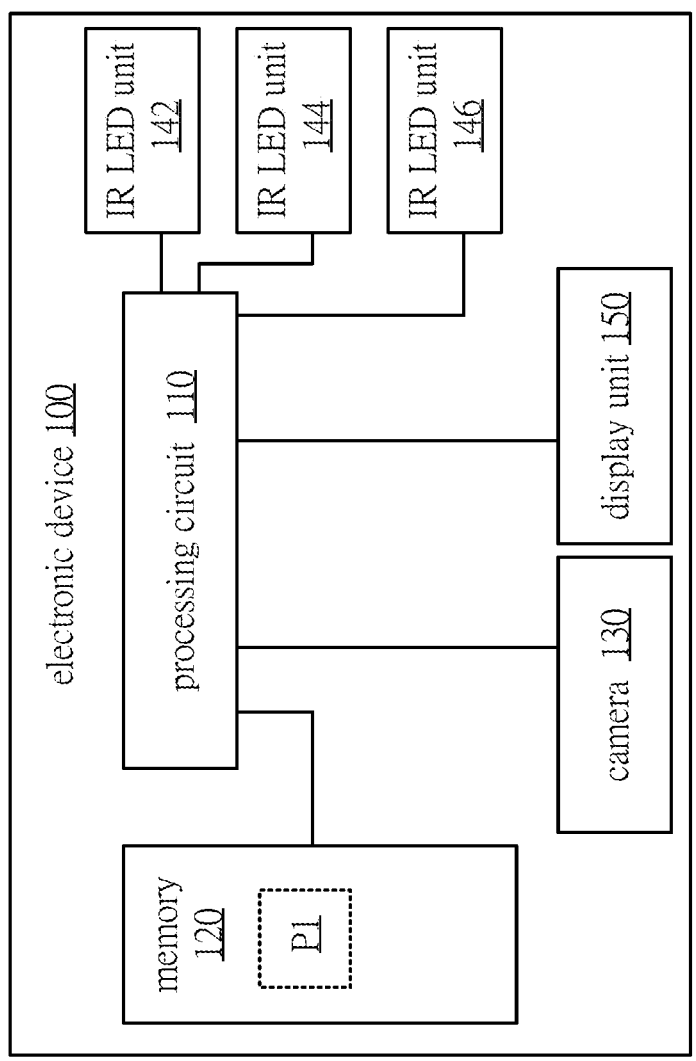
FIG. 1 is a schematic block diagram illustrating an electronic device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating an electronic device 100 in accordance with some embodiments of the present disclosure. The electronic device 100 may be configured to perform eye tracking to detect a gaze direction of user. Specifically, in some embodiments, the electronic device 100 may be applied in a virtual reality (VR)/mixed reality (MR)/augmented reality (AR) system. For example, the electronic device 100 may be realized by, a standalone head mounted device (HMD) or VIVE HMD. In detail, the standalone HMD or VIVE HMD may handle such as processing location data of position and rotation, graph processing or others data calculation.

As shown in FIG. 1, the electronic device 100 includes a processing circuit 110, a memory 120, a camera 130, infrared light-emitting diodes (IR LED) units 142, 144, 146, and a display unit 150. One or more programs P1 are stored in the memory 120 and configured to be executed by the processing circuit 110, in order to perform the eye tracking method.

The processing circuit 110 is electrically connected to the camera. In some embodiments, the processing circuit 110 can be realized by, for example, one or more processors, such as central processors and/or microprocessors, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In structural, the memory 120 is electrically connected to the processing circuit 110. The camera 130 is configured to capture one or more images of an eye of the user, such that the processing circuit 110 may analyze the one or more images to perform eye tracking. In some embodiments, the camera 130 may be realized by an infrared camera device. The one or more IR LED units 142, 144, 146 may be electrically connected to the processing circuit 110 and configured to provide one or more infrared rays, in which the image of the eye are captured by the infrared camera device using the one or more infrared rays. It is noted that, the embodiments shown in FIG. 1 is merely an example and not meant to limit the present disclosure. Alternatively stated, numbers, locations, and/or the arrangements of the IR LED units 142, 144, 146 may be adjusted based on the actual needs in various embodiments. The display unit 150 is electrically connected to the processing circuit 110, such that the video and/or audio content displayed by the display unit 150 is controlled by the processing circuit 110.

Figure 2:
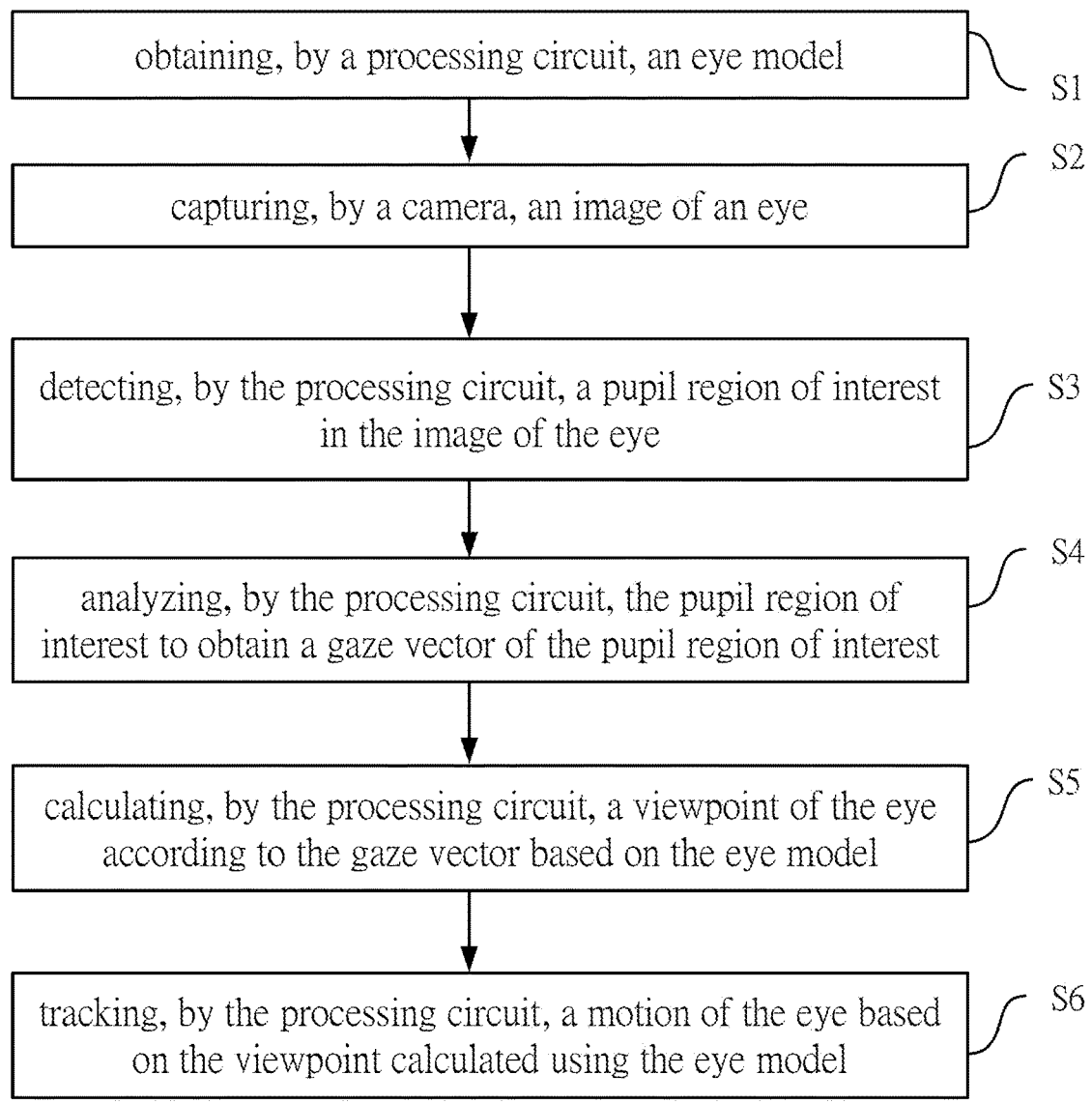
FIG. 2 is a flowchart illustrating the eye tracking method in accordance with some embodiments of the present disclosure.

Reference is made to FIG. 2. For better understanding of the present disclosure, the detailed operation of the electronic device 100 will be discussed in accompanying with the embodiments shown in FIG. 2. FIG. 2 is a flowchart illustrating the eye tracking method 900 in accordance with some embodiments of the present disclosure. It should be noted that the eye tracking method 900 can be applied to an electrical device having a structure that is the same as or similar to the structure of the electronic device 100 shown in FIG. 1. To simplify the description below, the embodiments shown in FIG. 1 will be used as an example to describe the eye tracking method 900 according to some embodiments of the present disclosure. However, the present disclosure is not limited to application to the embodiments shown in FIG. 1.

As shown in FIG. 2, the eye tracking method 900 includes operations S1, S2, S3, S4, S5 and S6. In operation S1, the processing circuit 110 is configured to obtain an eye model.

Figure 3:
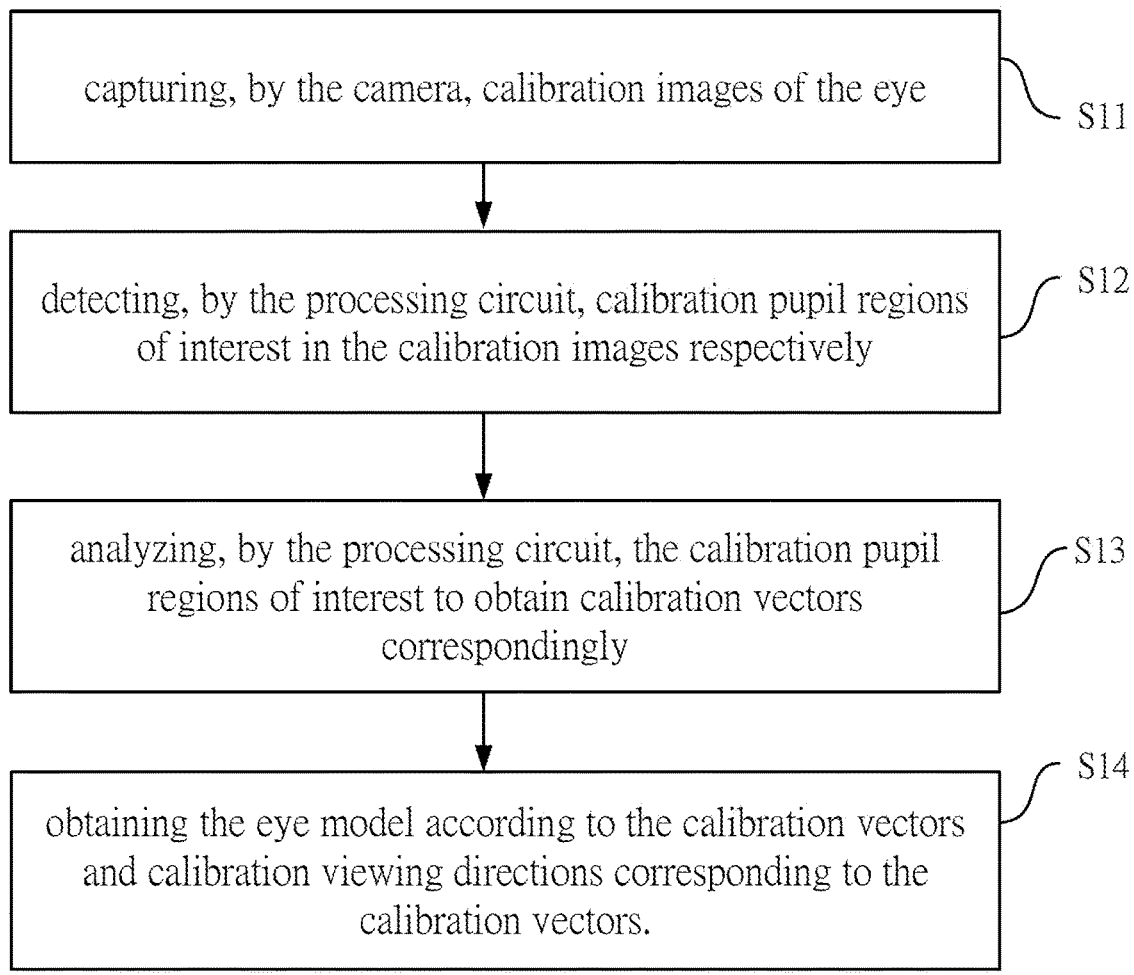
FIG. 3 is a flowchart illustrating the detailed operations in accordance with some embodiments of the present disclosure.

Reference is made to FIG. 3 together. FIG. 3 is a flowchart illustrating the detailed operations of the operation S1 in accordance with some embodiments of the present disclosure.

As shown in FIG. 3, in some embodiments, the operation S1 includes operations S11, S12, S13, and S14. In operation S11, the processing circuit 110 is configured to control the camera 130 to capture multiple calibration images of the eye.

Figure 4B:
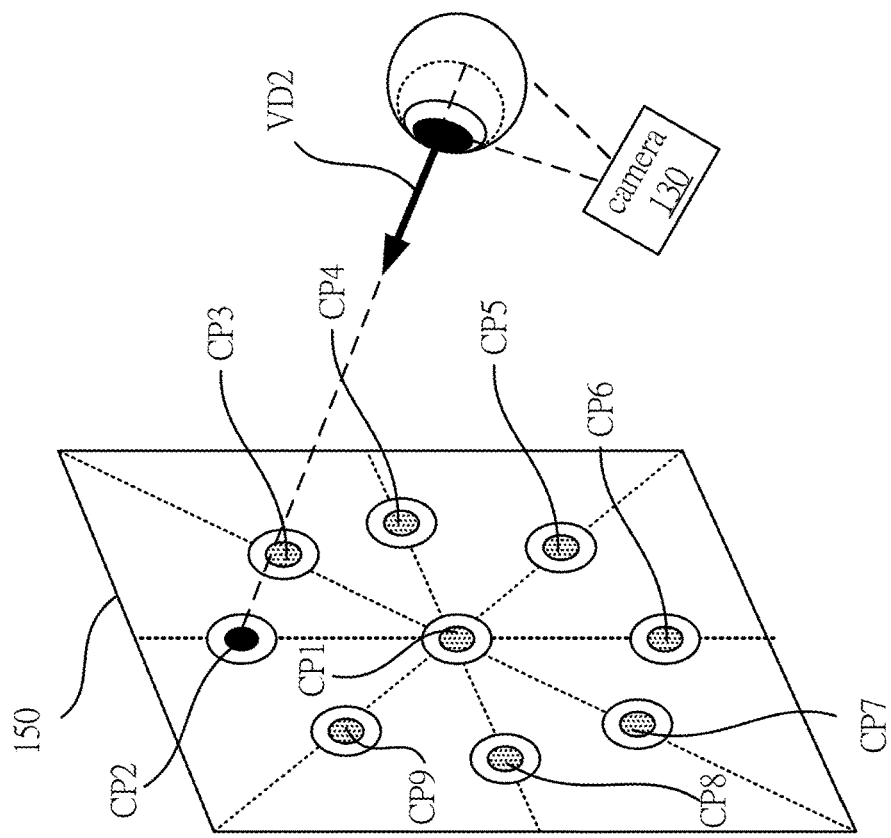
FIG. 4A and FIG. 4B are diagrams illustrating the operation of the electronic device according to some embodiments of the present disclosure.
Figure 4A:
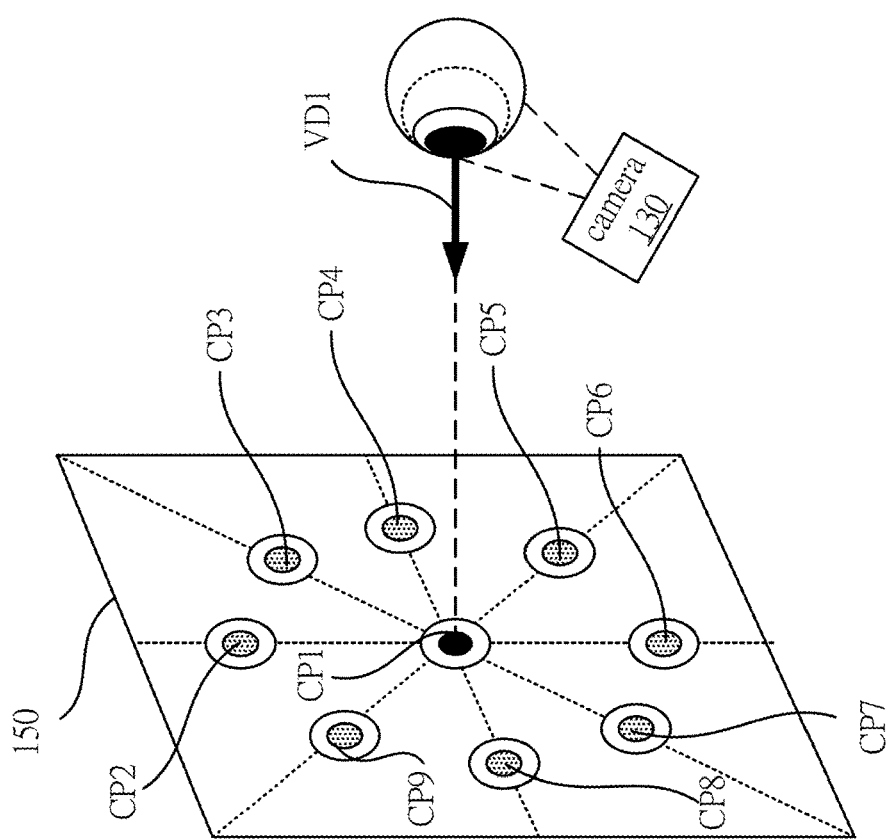

Reference is made to FIG. 4A and FIG. 4B. FIG. 4A and FIG. 4B are diagrams illustrating the operation of the electronic device 100 according to some embodiments of the present disclosure.

As shown in FIG. 4A and FIG. 4B, specifically, in operation S11, the processing circuit 110 may be configured to control the display unit 150 to display calibration gazing points CP1-CP9 sequentially in multiple frames. The calibration gazing points CP1-CP9 correspond to multiple calibration viewing directions respectively.

For example, in the first frame as depicted in FIG. 4A, the display unit 150 is displaying the corresponding calibration gazing point CP1, which corresponds to the calibration viewing direction VD1. In the next frame as depicted in FIG. 4B, the display unit 150 is displaying the corresponding calibration gazing point CP2, which corresponds to the calibration viewing direction VD2, and so on.

Accordingly, the processing circuit 110 may be configured to control the camera 130 to capture the calibration images of the eye in the multiple frames sequentially.

Next, in operation S12, the processing circuit 110 may be configured to detect calibration pupil regions of interest in the calibration images respectively.

Specifically, the processing circuit 110 may perform feature extraction to the calibration images in order to find the corresponding calibration pupil regions of interest. For example, image filtering may be performed to modify or enhance the image of the eye to emphasize the pupil features and/or remove other features, and reduce or eliminate the noise of the image. On the condition that there are two or more candidates in the image, the false targets may also be eliminated using proper image filtering methods.

In some embodiments, Haar-like features may be used to calculate the features in the image. Then, mean shift algorithm may be applied for image segmentation, and a center and a contour of the pupil in the image of the eye may be determined accordingly. In some other embodiments, machine learning/deep learning method related to computer vision may be applied to identify and determine the center and the contour of the pupil in the image of the eye. For example, Convolutional Neural Network (CNN) may be applied, but the present disclosure is not limited thereto.

Alternatively stated, in operation S12, the processing circuit 110 may be configured to determine the center of the pupil in the image of the eye, and determine the contour of the pupil in the image of the eye. Then, the processing circuit 110 may be configured to fit an ellipse to the pupil according to the center and the contour of the pupil, to obtain the calibration pupil region of interest.

Next, in operation S13, the processing circuit 110 is configured to analyze the calibration pupil regions of interest to obtain calibration vectors correspondingly.

Figure 5B:
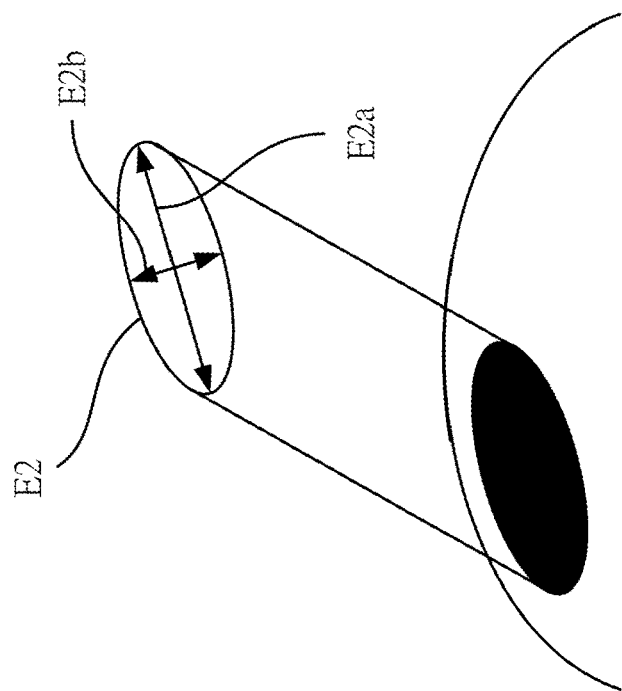
FIG. 5A and FIG. 5B are diagrams illustrating operations of the electronic device according to some embodiments of the present disclosure.
Figure 5A:
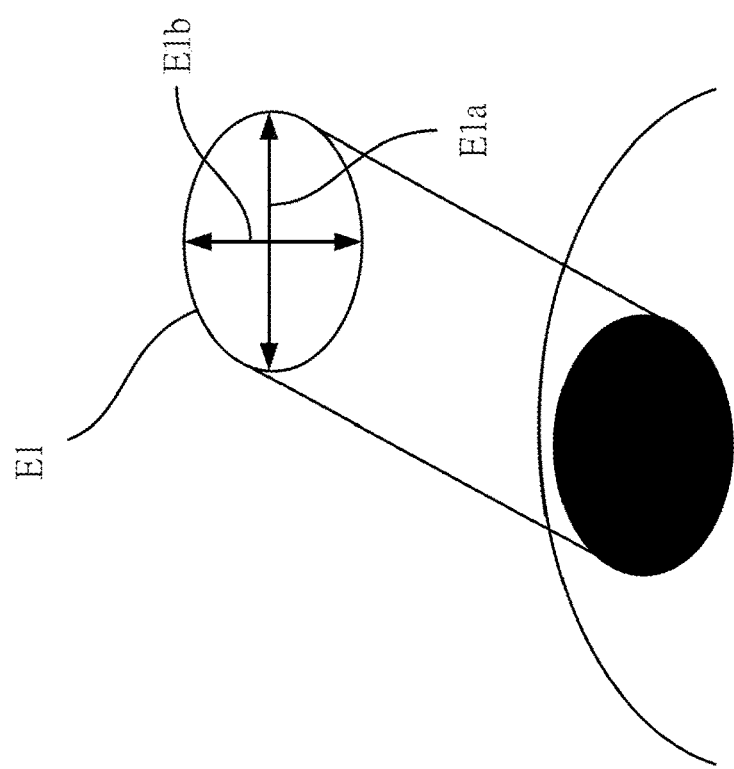

Reference is made to FIG. 5A and FIG. 5B. FIG. 5A and FIG. 5B are diagrams illustrating operations of the electronic device 100 according to some embodiments of the present disclosure. As shown in FIG. 5A and FIG. 5B, the calibration pupil regions of interest are fitted as ellipses E1, E2 with different center coordinates, with different rotation angles, and/or with different major axis E1a, E2a and minor axis E1b, E2b. Alternatively stated, when the user looks at different calibration viewing directions, different ellipses E1, E2 are fitted as the calibration pupil regions of interest. Accordingly, parameters of the major axis E1a, E2a and the minor axis E1b, E2b of the ellipses E1, E2 may be calculated and obtained to be the calibration vectors. In one embodiment, the calibration vectors can be realized by normal vectors of surfaces which are formed by the major axis E1a, E2a and the minor axis E1b, E2b of the ellipses E1, E2.

Therefore, after the calibration vectors are obtained, operation S14 may be performed. In operation S14, the processing circuit 110 is configured to obtain the eye model according to the calibration vectors and calibration viewing directions corresponding to the calibration vectors. For example, the eye model may include a matrix indicating relationship between the viewpoint of the eye and the gaze vector of the pupil region of interest. Specifically, in some embodiments, a polynomial equation may be obtained to indicate the relationship between the ellipse parameters (e.g., major axis and the minor axis) and polar coordinates of the corresponding gazing points, which represent the viewing directions of the eye. The eye model may include the companion matrix of the polynomial equation to indicate the relationship thereof.

Accordingly, after the eye model is obtained in operation S1, eye tracking may be executed in the following operations S2-S6 as the user performs various interaction with the contents displayed in display unit 150 while wearing the HMD device. Since the calibration of the eye model is performed in operation S1 to meet one or more users' specific pupil shape, the accuracy of eye tracking is improved.

Figure 6:
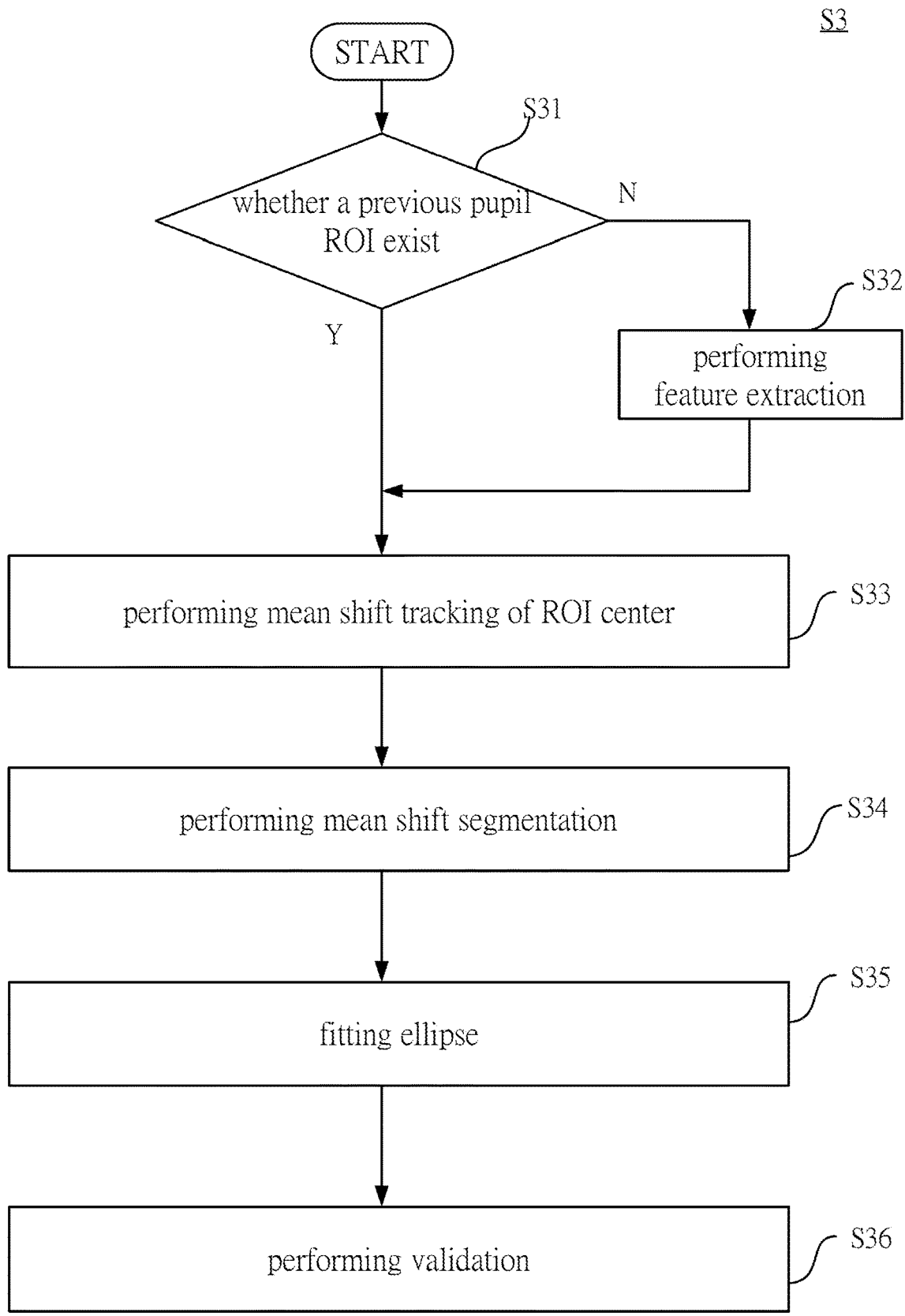
FIG. 6 is a flowchart illustrating detailed operations in accordance with some embodiments of the present disclosure.

In operation S2, the processing circuit 110 is configured to control the camera 130 to capture an image of an eye. Next, in operation S3, the processing circuit 110 is configured to detect a pupil region of interest in the image of the eye. The operations of detecting the pupil region of interest are similar to the operations of detecting the calibration pupil region of interests in operation S1. Reference is made to FIG. 6. FIG. 6 is a flowchart illustrating detailed operations in operation S3 in accordance with some embodiments of the present disclosure.

As shown in FIG. 6, in operation S31, the processing circuit 110 determines whether a previous pupil region of interest exists. If the previous pupil region of interest exists, which indicates the target is tracked, operation S33 is executed. If the previous pupil region of interest does not exist, which indicates the tracking is lost or in the initiative state, operation S32 is executed to perform feature extraction, in which a haar like cascade or a CNN algorithm may be applied.

Next, in operations S33 and S34, the mean shift tracking of ROI center and the mean shift segmentation are performed to find the center and the contour of the pupil. Next, in operation S35, the corresponding ellipse is fitted according to the center and the contour of the pupil. Finally, after the validation is performed and checked in operation S36, the pupil region of interest is obtained. One skilled in the art can understand the detailed operations depicted in FIG. 6 and thus further explanations are omitted for the sake of brevity.

Next, in operation S4, the processing circuit 110 is configured to analyze the pupil region of interest to obtain a gaze vector of the pupil region of interest.

In some embodiments, the gaze vector includes a major axis and a minor axis indicating a shape of the pupil region of interest. As previously discussed in FIG. 5A and FIG. 5B, the pupil region of interest, as well as the calibration pupil regions of interest, may be a corresponding ellipse, in which the major axis and the minor axis of the ellipse may be used to identify the viewing direction.

Figure 7A:
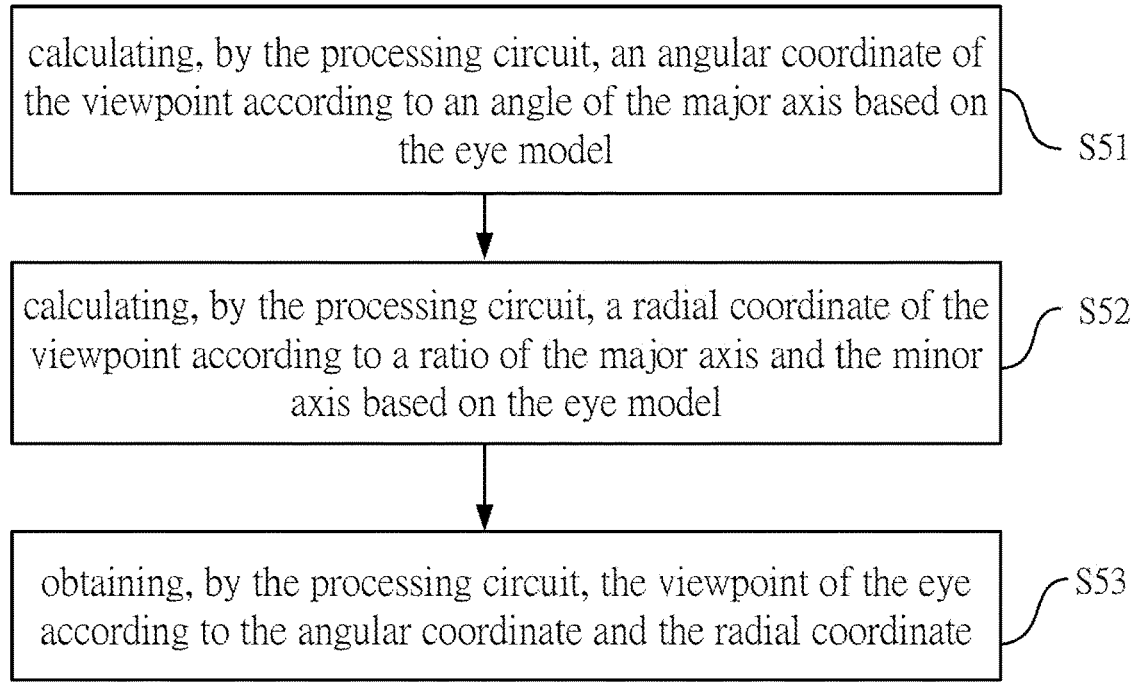
FIG. 7A is a flowchart illustrating detailed operations in accordance with some embodiments of the present disclosure.

Next, in operation S5, the processing circuit 110 is configured to calculate a viewpoint of the eye according to the gaze vector based on the eye model. Reference is made to FIG. 7A. FIG. 7A is a flowchart illustrating detailed operations in operation S5 in accordance with some embodiments of the present disclosure.

As shown in FIG. 7A, in operation S51, the processing circuit 110 is configured to calculate an angular coordinate of the viewpoint according to an angle of the major axis based on the eye model. In operation S52, the processing circuit 110 is configured to calculate a radial coordinate of the viewpoint according to a ratio of the major axis and the minor axis based on the eye model. Finally, in operation S53, the processing circuit 110 is configured to obtain the viewpoint of the eye according to the angular coordinate and the radial coordinate.

Figure 7B:
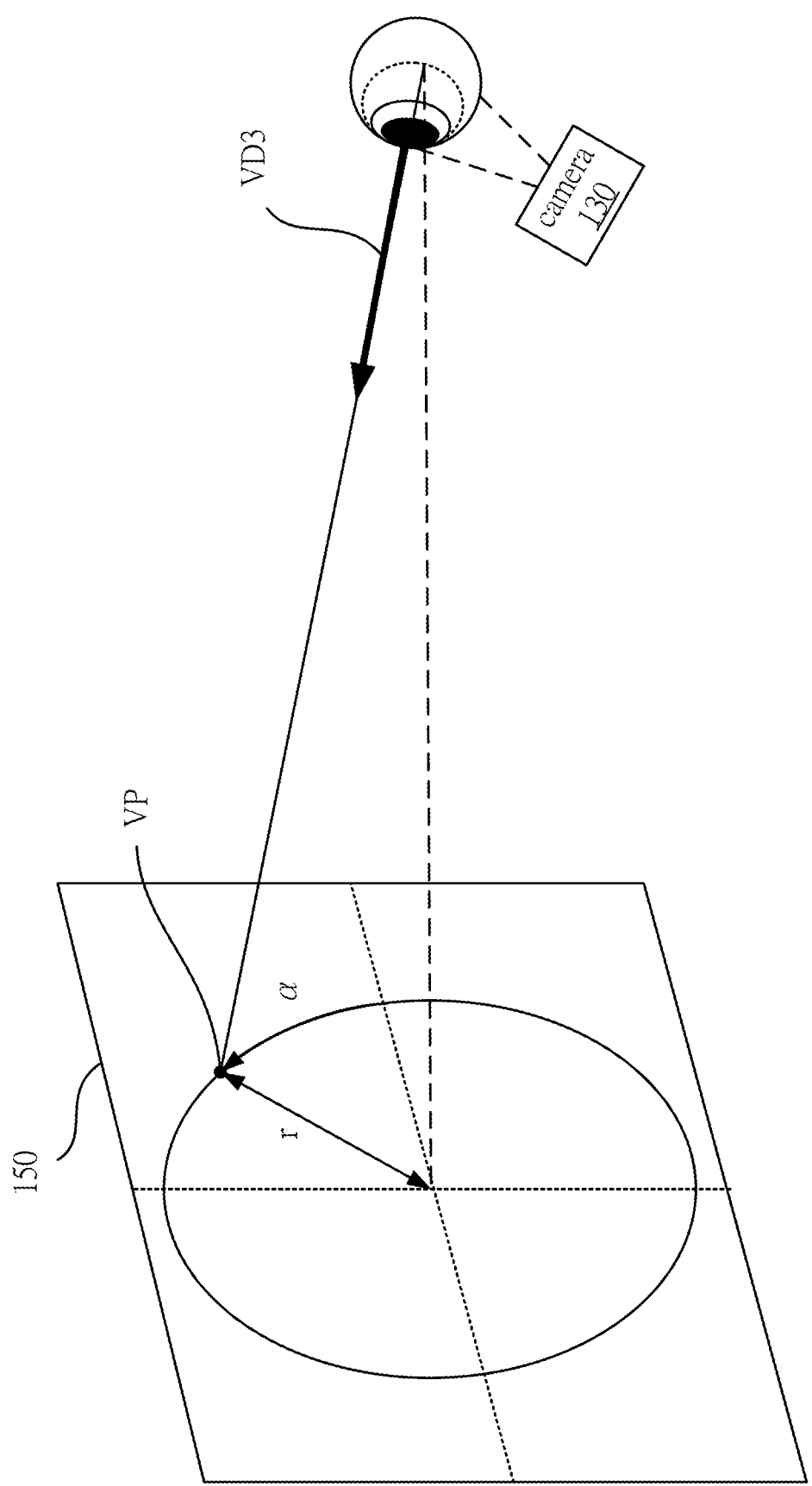
FIG. 7B is a diagram illustrating the operation of the electronic device according to some embodiments of the present disclosure.

Reference is made to FIG. 7B accordingly. FIG. 7B is a diagram illustrating the operation of the electronic device 100 according to some embodiments of the present disclosure. As shown in FIG. 7B, the user gazes at the viewpoint VP on the screen of the display unit 150 with the viewing direction VD3. If the viewpoint VP is denoted in the polar coordinate systems, the angular coordinate α of the viewpoint is correlated to the angle of the major axis. In addition, the radial coordinate r of the viewpoint is correlated to the ratio of the major axis and the minor axis. For example, on the condition that the viewpoint VP is away from the center, the ellipticity (or oblateness, flattening) of the pupil increases, and results in greater ratio between the major axis and the minor axis. That is, greater the ratio between the major axis and the minor axis, greater the radial coordinate r. Furthermore, as the angular coordinate α of the viewpoint varies, the rotating angle of the ellipse changes correspondingly and results in the changes of the angle of the major axis. Accordingly, by applying the eye model obtained in operation S1, the viewpoint VP and the viewing direction VD3 of the eye may be calculated and obtained.

Thus, in operation S6, the processing circuit 110 may be configured to track a motion of the eye based on the viewpoint calculated using the eye model, and achieve the eye tracking to trace the gaze direction of the user, in order to execute interactions properly. For example, the processing circuit 110 may control the video and/or audio content displayed by the display unit 150 based on the gaze direction of the user, in order to provide a smooth VR experience and/or a friendly user interactive interface.

In summary, a Pupil Center-Ellipse Ratio (PCER) eye tracking method is realized as discussed in various embodiments mentioned above, in which the eye tracker may process successfully with one time calibration at the beginning.

Figure 8:
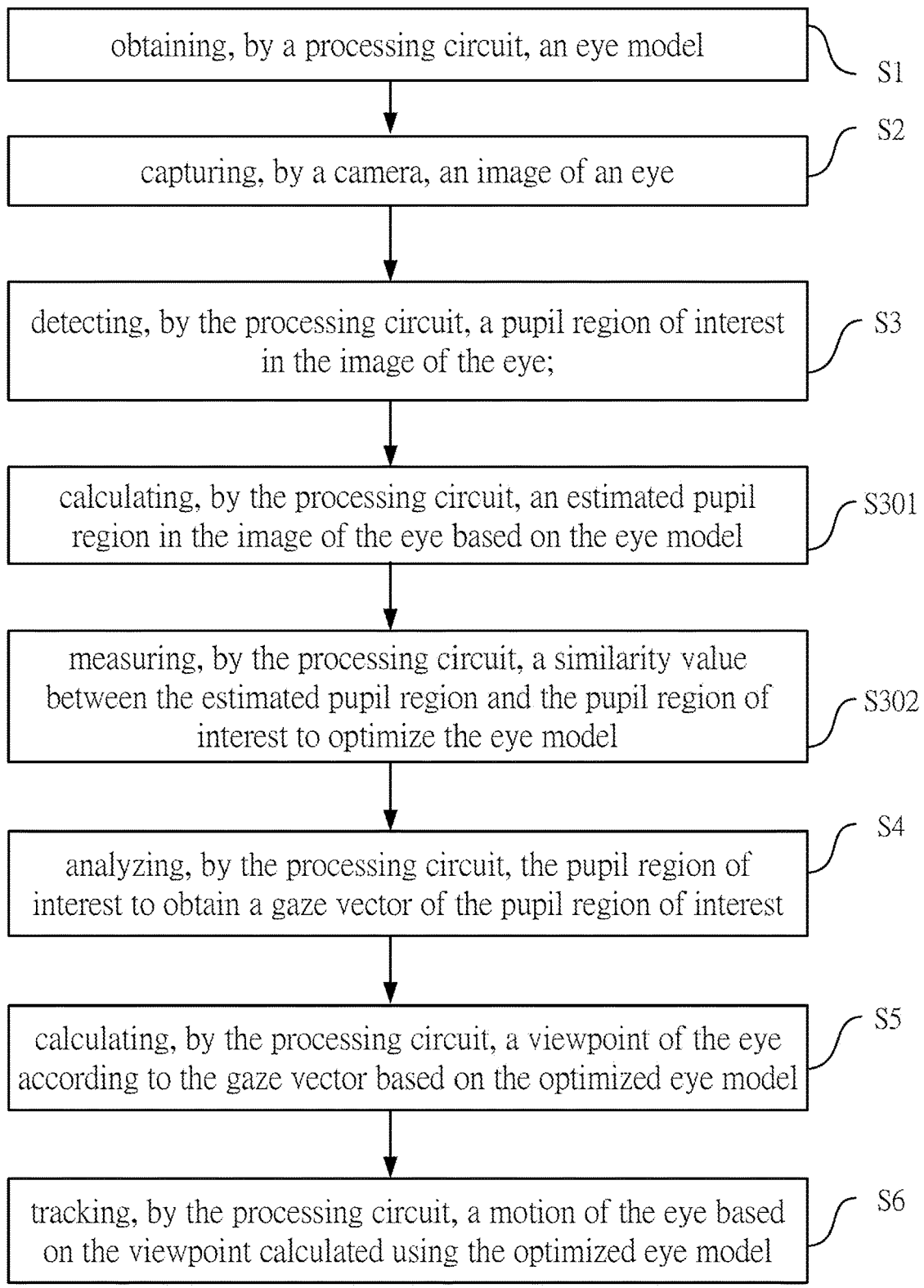
FIG. 8 is a flowchart illustrating the eye tracking method in accordance with some other embodiments of the present disclosure.

Reference is made to FIG. 8. FIG. 8 is a flowchart illustrating the eye tracking method 900 in accordance with some other embodiments of the present disclosure. With respect to the embodiments of FIG. 8, like elements in FIG. 2 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 8.

Compared to the embodiments in FIG. 2, in the embodiments shown in FIG. 8, the eye tracking method 900 may further include operations S301 and S302 to perform a head position calibration. The relative position and/or angle of the HMD may shift with the user's movement such as head nodding or shaking. The head position calibration may be performed to optimize the eye model to increase the accuracy of the eye tracking.

In operation S301, the processing circuit 110 is configured to calculate an estimated pupil region in the image of the eye based on the eye model. Next, in operation S302, the processing circuit 110 is configured to measure a similarity value between the estimated pupil region and the pupil region of interest to optimize the eye model. Accordingly, in the following operation S5, the viewpoint of the eye may be calculated according to the gaze vector based on the optimized eye model. In the following operation S6, the motion of the eye is tracked based on the viewpoint calculated using the optimized eye model.

Figure 9:
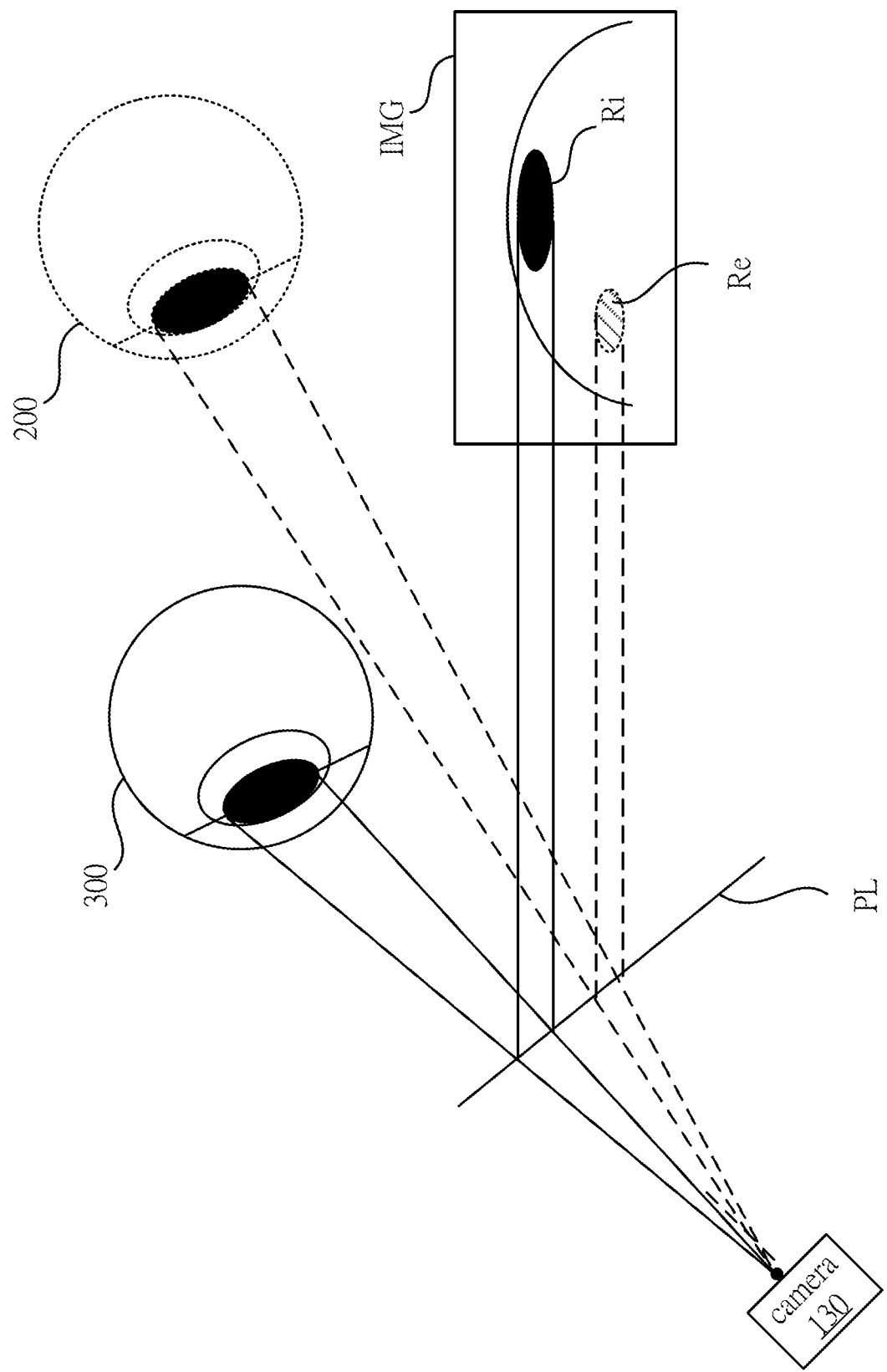
FIG. 9 is a diagram illustrating operations of the electronic device according to some embodiments of the present disclosure.

Reference is made to FIG. 9. FIG. 9 is a diagram illustrating operations of the electronic device 100 according to some embodiments of the present disclosure. As shown in FIG. 9, the eye 200 indicates the position of an estimated 3D eye model obtained by the processing circuit 110. On the other hand, the eye 300 indicates the position of the realtime actual eye of the user.

Accordingly, for the image IMG captured by the camera 130 on the image plane PL, the estimated pupil region Re calculated based on the eye model and the pupil region of interest Ri obtained by the image analysis are not perfectly coincided.

Thus, by comparing the similarity between the estimated pupil region Re and the pupil region of interest in operation S302, the accuracy of the eye model may be valued, and the eye model may be optimized correspondingly if the original eye model is failed due to the change of the position and/or angle of the HMD.

Specifically, in operation S302, the processing circuit 110 may be configured to measure multiple error values between multiple estimated pupil regions Re and multiple pupil regions of interest Ri sequentially in different time points. Then, the processing circuit 110 may be configured to optimize the eye model to minimize a cost function according to the error values.

For example, in some embodiments, the cost function may be represented by the following equations.

$$q_e = ARTMp_e$$
$$q_i = [u \ v \ w \ \rho]^T$$
$$\text{Cost} = \left\| \sum q_e - \frac{q_i}{\rho} \right\|^2 + \lambda f(R, T)$$

In the above equations, A denotes a camera intrinsic matrix, R denotes a rotation matrix, T denotes a translation matrix, M denotes a refraction matrix. $p_e$ denotes a point on pupil contour of the estimated 3D eye model. Accordingly, $q_i$ denotes a predicted 2D image point on pupil contour of the estimated 3D eye model (e.g., an image point of the estimated pupil region Re). $q_i$ denotes a real 2D image point on pupil contour (e.g., an image point of the pupil region of interest Ri). $f(R, T)$ denotes a cost function of spatial constrain. In some embodiments, cost function of spatial constrain indicates limitation of the eye relief and/or eye box, but the present disclosure is not limited thereto.

Accordingly, various machine learning methods may be applied to minimize the cost of errors between the estimated pupil region Re and the pupil region of interest Ri to optimize the eye model. The optimized eye model, similarly to the original eye model, includes a matrix indicating relationship between the viewpoint of the eye and the gaze vector of the pupil region of interest.

In some embodiments, in the head position calibration process of operations S301 and S302, the movement and the rotation of the head may also be estimated based on the eye model and the obtained image correspondingly. That is, the head facing direction may be determined. Accordingly, on the condition that the position of the display plane and the viewing axis are known, the viewing point may be calculated as the point the viewing axis crosses the display plane. Therefore, the rotation and the movement of the head of the user are taken into account during the eye tracking.

It is noted that the head position calibration process discussed above may also be applied other eye tracking method, such as a Pupil Center-Corneal Reflection (PCCR) eye tracking method, in which the eye model may be obtained in various ways, and not limited to the operations S11-S14 in the embodiments of FIG. 3-FIG. 6.

Through the operations of various embodiments described above, an eye tracking method with the head position calibration process is implemented to realize the eye tracker for the application in the VR, AR or MR and increase the accuracy of eye tracking, which brings a smoother user experience for the user wearing the HMD to interact with the object in the VR, AR or MR environment.

It is noted that the above embodiments are simplified for better understanding of the present disclosure. It should be noted that, in some embodiments, the eye tracking method 900 may be implemented as a computer program. When the computer program is executed by a computer, an electronic device, or the processing circuit 110 in FIG. 1, this executing device performs the eye tracking method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned eye tracking method 900, no particular sequence is required unless otherwise specified. Moreover, the operations may also be performed simultaneously or the execution times thereof may at least partially overlap.

Furthermore, the operations of the eye tracking method 900 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the scope of the appended claims should not be limited to the description of the embodiments contained herein.

What is claimed is:

1. An eye tracking method comprising:
    capturing, by a camera, an image of an eye;
    detecting, by a processing circuit, a pupil region of interest in the image of the eye;
    analyzing, by the processing circuit, the pupil region of interest to obtain a gaze vector of the pupil region of interest, wherein the gaze vector comprises a major axis and a minor axis indicating a shape of the pupil region of interest;
    calculating, by the processing circuit, a viewpoint of the eye according to the gaze vector based on an eye model, wherein the eye model comprises a matrix indicating relationship between the viewpoint of the eye and the gaze vector of the pupil region of interest; and
    tracking, by the processing circuit, a motion of the eye based on the viewpoint calculated using the eye model,
    wherein the calculating the view point comprises:
        calculating, by the processing circuit, an angular coordinate of the viewpoint according to an angle of the major axis based on the eye model;
        calculating, by the processing circuit, a radial coordinate of the viewpoint according to a ratio of the major axis and the minor axis based on the eye model; and
        obtaining, by the processing circuit, the viewpoint of the eye according to the angular coordinate and the radial coordinate.

2. The eye tracking method of claim 1, further comprising:
    capturing, by the camera, a plurality of calibration images of the eye, wherein the plurality of calibration images respectively indicate a plurality of calibration viewing directions;
    detecting, by the processing circuit, a plurality of calibration pupil regions of interest in the plurality of calibration images respectively;
    analyzing, by the processing circuit, the calibration pupil regions of interest to obtain a plurality of calibration vectors correspondingly; and
    obtaining the eye model according to the plurality of calibration vectors and the plurality of calibration viewing directions corresponding to the plurality of calibration vectors.

3. The eye tracking method of claim 2, further comprising:
    displaying, by a display unit, a plurality of calibration gazing points sequentially in a plurality of frames, wherein the plurality of calibration gazing points correspond to the plurality of calibration viewing directions respectively; and
    capturing, by the camera, the plurality of calibration images of the eye in the plurality of frames sequentially.

4. The eye tracking method of claim 1, wherein detecting the pupil region of interest comprising:
    determining, by the processing circuit, a center of the pupil in the image of the eye;
    determining, by the processing circuit, a contour of the pupil in the image of the eye; and
    fitting, by the processing circuit, an ellipse to the pupil according to the center and the contour of the pupil to obtain the pupil region of interest.

5. The eye tracking method of claim 1, further comprising:
    providing, by one or more IR LED units, one or more infrared rays;
    wherein the image of the eye are captured using the one or more infrared rays.

6. An electronic device, comprising:
    a camera;
    a processing circuit electrically connected to the camera;
    a memory electrically connected to the processing circuit; and
    one or more programs, wherein the one or more programs are stored in the memory and configured to be executed by the processing circuit, the one or more programs comprising instructions for:
controlling the camera to capture an image of an eye;
detecting a pupil region of interest in the image of the eye;
analyzing the pupil region of interest to obtain a gaze vector of the pupil region of interest, wherein the gaze vector comprises a major axis and a minor axis indicating a shape of the pupil region of interest;
calculating a viewpoint of the eye according to the gaze vector based on an eye model, wherein the eye model comprises a matrix indicating relationship between the viewpoint of the eye and the gaze vector of the pupil region of interest; and
tracking a motion of the eye based on the viewpoint calculated using the eye model,
wherein the calculating the view point comprises:
calculating an angular coordinate of the viewpoint according to an angle of the major axis based on the eye model;
calculating a radial coordinate of the viewpoint according to a ratio of the major axis and the minor axis based on the eye model; and
obtaining the viewpoint of the eye according to the angular coordinate and the radial coordinate.

7. The electronic device as claimed in claim 6, wherein the one or more programs further comprise instructions for:
controlling the camera to capture a plurality of calibration images of the eye, wherein the plurality of calibration images respectively indicate a plurality of calibration viewing directions;
detecting a plurality of calibration pupil regions of interest in the plurality of calibration images respectively;
analyzing the calibration pupil regions of interest to obtain a plurality of calibration vectors correspondingly; and
obtaining the eye model according to the plurality of calibration vectors and the plurality of calibration viewing directions corresponding to the plurality of calibration vectors.

8. The electronic device as claimed in claim 7, further comprising a display unit electrically connected to the processing circuit, wherein the one or more programs further comprise instructions for:
controlling the display unit to display a plurality of calibration gazing points sequentially in a plurality of frames, wherein the plurality of calibration gazing points correspond to the plurality of calibration viewing directions respectively; and
controlling the camera to capture the plurality of calibration images of the eye in the plurality of frames sequentially.

9. The electronic device as claimed in claim 6, wherein the one or more programs further comprise instructions for:
determining a center of the pupil in the image of the eye;
determining a contour of the pupil in the image of the eye; and
fitting an ellipse to the pupil according to the center and the contour of the pupil to obtain the pupil region of interest.

10. The electronic device as claimed in claim 6, further comprising one or more IR LED units electrically connected to the processing circuit, wherein the one or more programs further comprise instructions for:
controlling the one or more IR LED units to provide one or more infrared rays, wherein the image of the eye are captured using the one or more infrared rays.

11. A non-transitory computer readable storage medium storing one or more programs, comprising instructions, which when executed, causes a processing circuit to perform operations comprising:
controlling a camera to capture an image of an eye;
detecting a pupil region of interest in the image of the eye;
analyzing the pupil region of interest to obtain a gaze vector of the pupil region of interest, wherein the gaze vector comprises a major axis and a minor axis indicating a shape of the pupil region of interest;
calculating a viewpoint of the eye according to the gaze vector based on an eye model, wherein the eye model comprises a matrix indicating relationship between the viewpoint of the eye and the gaze vector of the pupil region of interest; and
tracking a motion of the eye based on the viewpoint calculated using the eye model,
wherein the calculating the view point comprises:
calculating an angular coordinate of the viewpoint according to an angle of the major axis based on the eye model;
calculating a radial coordinate of the viewpoint according to a ratio of the major axis and the minor axis based on the eye model; and
obtaining the viewpoint of the eye according to the angular coordinate and the radial coordinate.

12. The non-transitory computer readable storage medium as claimed in claim 11, further comprising instructions, which when executed, causes the processing circuit to further perform operations comprising:
controlling the camera to capture a plurality of calibration images of the eye, wherein the plurality of calibration images respectively indicate a plurality of calibration viewing directions;
detecting a plurality of calibration pupil regions of interest in the plurality of calibration images respectively;
analyzing the calibration pupil regions of interest to obtain a plurality of calibration vectors correspondingly; and
obtaining the eye model according to the plurality of calibration vectors and the plurality of calibration viewing directions corresponding to the plurality of calibration vectors.

13. The non-transitory computer readable storage medium as claimed in claim 12, further comprising instructions, which when executed, causes the processing circuit to further perform operations comprising:
controlling a display unit to display a plurality of calibration gazing points sequentially in a plurality of frames, wherein the plurality of calibration gazing points correspond to the plurality of calibration viewing directions respectively; and
controlling the camera to capture the plurality of calibration images of the eye in the plurality of frames sequentially.

14. The non-transitory computer readable storage medium as claimed in claim 11, further comprising instructions, which when executed, causes the processing circuit to further perform operations comprising:
determining a center of the pupil in the image of the eye;
determining a contour of the pupil in the image of the eye; and
fitting an ellipse to the pupil according to the center and the contour of the pupil to obtain the pupil region of interest.

* * * * *